US008346750B2

(12) United States Patent
Schachter

(10) Patent No.: US 8,346,750 B2
(45) Date of Patent: *Jan. 1, 2013

(54) SYSTEM AND METHOD FOR ADDING IDENTITY TO WEB RANK

(75) Inventor: Joshua Schachter, Palo Alto, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/282,537

(22) Filed: Oct. 27, 2011

(65) Prior Publication Data
US 2012/0041940 A1 Feb. 16, 2012

Related U.S. Application Data

(63) Continuation of application No. 12/907,456, filed on Oct. 19, 2010, now Pat. No. 8,051,065, which is a continuation of application No. 11/965,296, filed on Dec. 27, 2007, now Pat. No. 7,840,548.

(51) Int. Cl.
*G06F 17/30* (2006.01)

(52) U.S. Cl. ........ 707/706; 707/708; 707/723; 707/726; 707/728

(58) Field of Classification Search .......... 707/706–709, 707/723, 726, 728, 731, 748
See application file for complete search history.

(56) References Cited

U.S. PATENT DOCUMENTS

| | | | |
|---|---|---|---|
| 8,005,823 B1 * | 8/2011 | Marshall et al. | 707/721 |
| 2003/0115189 A1 * | 6/2003 | Srinivasa et al. | 707/3 |
| 2003/0229624 A1 * | 12/2003 | Petrisor et al. | 707/3 |
| 2005/0076097 A1 * | 4/2005 | Sullivan et al. | 709/218 |
| 2006/0106847 A1 * | 5/2006 | Eckardt et al. | 707/101 |
| 2007/0043723 A1 * | 2/2007 | Bitan et al. | 707/7 |
| 2007/0185858 A1 * | 8/2007 | Lu et al. | 707/5 |
| 2007/0192293 A1 * | 8/2007 | Swen | 707/3 |
| 2007/0208613 A1 * | 9/2007 | Backer | 705/10 |
| 2007/0208679 A1 * | 9/2007 | Tseng et al. | 706/45 |
| 2007/0239676 A1 * | 10/2007 | Stonehocker et al. | 707/3 |
| 2007/0266022 A1 * | 11/2007 | Frumkin et al. | 707/5 |
| 2007/0283291 A1 * | 12/2007 | Morris | 715/804 |
| 2008/0021981 A1 * | 1/2008 | Kumar et al. | 709/219 |
| 2008/0071929 A1 * | 3/2008 | Motte et al. | 709/246 |
| 2008/0082486 A1 * | 4/2008 | Lermant et al. | 707/3 |
| 2008/0091797 A1 * | 4/2008 | Busey | 709/217 |
| 2008/0208803 A1 * | 8/2008 | Becher et al. | 707/3 |
| 2008/0215583 A1 * | 9/2008 | Gunawardena et al. | 707/7 |
| 2008/0235005 A1 * | 9/2008 | Golan et al. | 704/9 |
| 2009/0138464 A1 * | 5/2009 | Schneider | 707/5 |
| 2009/0150345 A1 * | 6/2009 | Van Luchene | 707/3 |

* cited by examiner

*Primary Examiner* — Hanh Thai
(74) *Attorney, Agent, or Firm* — Seth H. Ostrow; Ostrow Kaufman LLP

(57) ABSTRACT

Embodiments of the present invention provide systems, methods and computer program products for generating search results comprising web documents with associated expert information. One embodiment of a method for generating such search results includes receiving one or more search queries, selecting one of the one or more search queries, determining one or more categories of web documents responsive to the selected search query and crawling a web graph of linked web documents to identify one or more web documents tagged as within the one or more categories responsive to the selected search query. The method further includes generating a result set of the one or more web documents identified as within the one or more categories responsive to the selected search query, ranking the result set and generating a list of ranked search results responsive to the selected search.

18 Claims, 10 Drawing Sheets

SYSTEM AND METHOD FOR ADDING IDENTITY TO WEB RANK

CLAIM OF PRIORITY

This application is a Continuation of and claims priority to U.S. patent application Ser. No. 12/907,456, filed Oct. 19, 2010, which is a continuation of and claims priority to U.S. patent application Ser. No. 11/965,296, filed Dec. 27, 2007, which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to generating expertise based search results. More specifically, the present invention is directed towards systems and methods for receiving a search query and generating search results comprising web documents with associated expert information.

BACKGROUND OF THE INVENTION

The World Wide Web (also referred to here as the "web") provides a large collection of interlinked information sources (in various formats including texts, images, and media content) relating to virtually every subject imaginable. As the web has grown, the ability of users to search this collection and identify content relevant to a particular subject has become increasingly important, and a number of search service providers now exist to meet this need.

Conventional search services rely on indexing the content of various web pages. A user submits a search query comprising one or more search terms; the search terms are matched against terms in an index of web content; and a list of results is generated based at least in part on how well the content of particular pages matches the search terms. Simply matching terms, however, turns out not to be a reliable way of providing content relevant to the actual interest of a user.

More recently, efforts have been made to improve upon the conventional search though a search system that allows for users who visit a particular web page or site to evaluate it and make their evaluations public. User evaluations can be used to assist subsequent searchers. For instance, users may be able to "tag" the content item with keywords or labels that describe the subject matter of the item; the tags assigned by various users can influence the system's response to subsequent queries by that user or other users.

As users participate over time, however, search results may be inundated with user evaluations that are arbitrary or unrelated, resulting in often unreliable and ineffective supplemented search results. Therefore, there exists a need for systems and methods for generating search results comprising web documents with reliable user evaluation information.

SUMMARY OF THE INVENTION

Generally, the present invention provides for systems, methods and computer program products for generating search results comprising web documents with associated expert information. The present invention is directed toward a method for generating search results comprising web documents with associated expert information and includes receiving one or more search queries, selecting one of the one or more search queries, determining one or more categories of web documents responsive to the selected search query and crawling a web graph of linked web documents to identify one or more web documents tagged as within the one or more categories responsive to the selected search query. The method further includes generating a result set of the one or more web documents identified as within the one or more categories responsive to the selected search query, ranking the result set of the one or more web documents identified as within the one or more categories responsive to the selected search query and generating a list of ranked search results responsive to the selected search.

The present invention also provides for systems, methods and computer program products for supplementing a web graph of linked web documents. The method for supplementing a web graph of linked web documents includes identifying an existing web graph of linked web documents, identifying one or more experts for one of one or more categories, identifying one or more documents tagged by the one or more experts for the given category and determining a corresponding category of the one or more web documents tagged by the one or more experts for the given category. The method further includes assigning a proxy web document to a given one of the one or more experts identified for the given category and linking the one or more proxy web documents to the one or more web documents in the existing web graph tagged by the expert corresponding to the given category for which the expert and an expert for.

The present invention also provides for systems, methods and computer program products for determining one or more experts corresponding to categories of web documents. The method includes identifying one or more users that input one or more tags, selecting one of the one or more users that input one or more tags, monitoring one or more secondary users' agreement with the one or more tags imputed by the selected user for a given time period, and identifying the selected user as an expert for one or more categories.

BRIEF DESCRIPTION OF THE DRAWINGS

The invention is illustrated in the Figs. of the accompanying drawings which are meant to be exemplary and not limiting, in which like references are intended to refer to like or corresponding parts, and in which.

DETAILED DESCRIPTION OF THE INVENTION

In the following description of the embodiments of the invention, reference is made to the accompanying drawings that form a part hereof, and in which is shown by way of illustration, exemplary embodiments in which the invention may be practiced. It is to be understood that other embodiments may be utilized and structural changes may be made without departing from the scope of the present invention.

Figure 1:
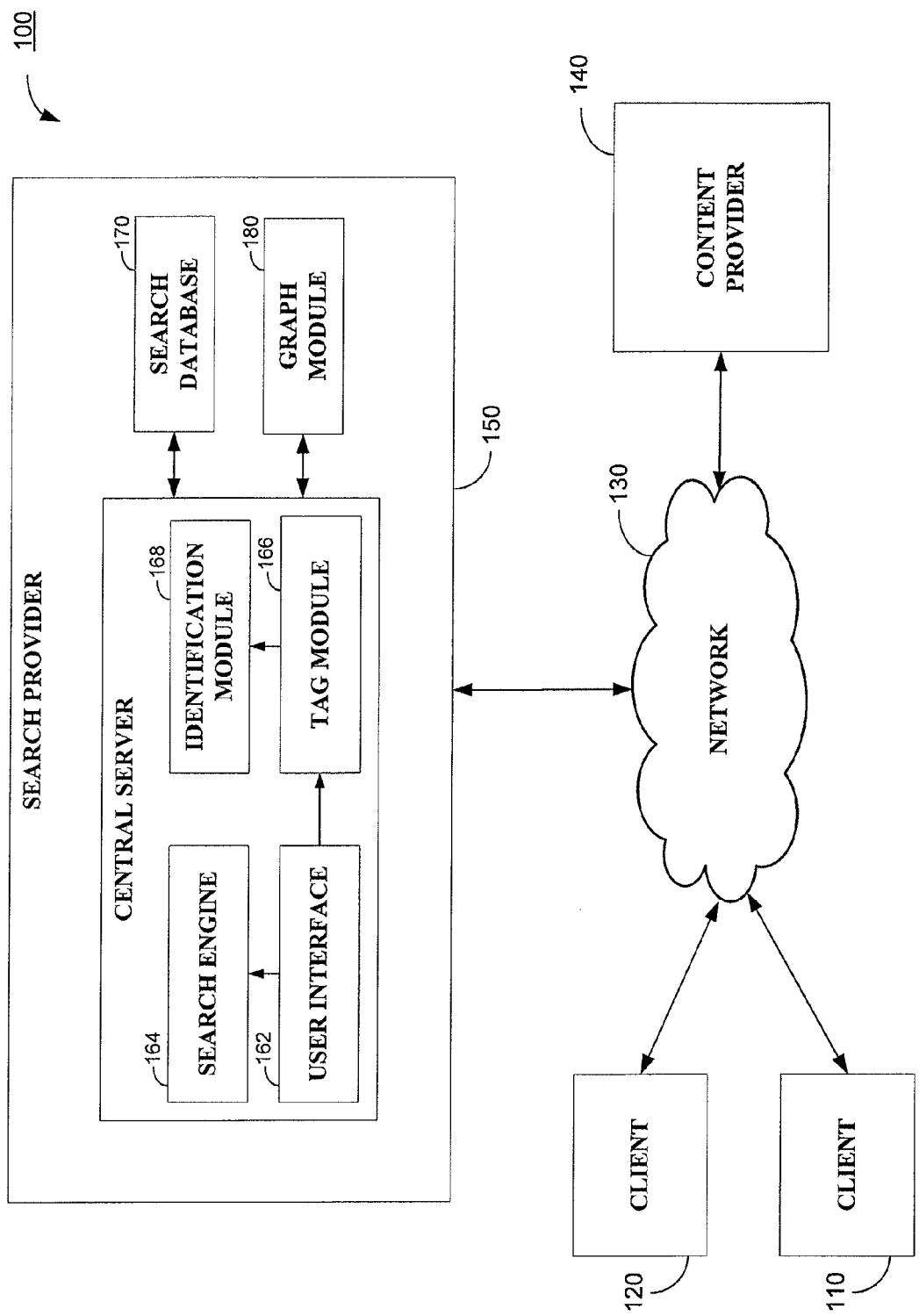
FIG. 1 illustrates a block diagram of a system for generating search results comprising web documents with associated expert information according to one embodiment of the present invention.

FIG. 1 illustrates one embodiment of a system for generating search results comprising web documents with associated expert information 100 that includes a first client device 110, a second client device 120, a computer network 130, a content provider 140, and a search provider 150. The search provider 150 comprises a central server 160, a search database 170, and a graph module 180. The central server 160 comprises a user interface 162, a search engine 164, a tag module 166 and an identification module 168.

The computer network 130 may be any type of computerized network capable of transferring data, such as the Internet. According to one embodiment of the invention, the first client device 110 and the second client device 120 are general purpose personal computers comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc. The present invention is not limited to only the first client device 110 and the second client device 120 and may comprise additional, disparate client devices. The first client device 110 and second client 120 are therefore presented for illustrative purposes representative of multiple client devices.

According to one embodiment of the invention, the central server 160 is a programmable processor-based computer device that includes persistent and transient memory, as well as one or more network connection ports and associated hardware for transmitting and receiving data on the network 130. The central server 160 may host websites, store data, serve ads, etc. Those of skill in the art understand that any number and type of central server 160, the first client device 110 and the second client device 120 may be connected to the network 130.

The search engine 164, the tag module 166, the identification module 168 and the graph module 180 may comprise one or more processing elements operative to perform processing operations in response to executable instructions, collectively as a single element or as various processing modules, which may be physically or logically disparate elements. The search database 170 may be one or more data storage devices of any suitable type, operative to store corresponding data therein. Those of skill in the art recognize that the search provider 150 may utilize more or fewer components and data stores, which may be local or remote with regard to a given component or data store.

In accordance with one embodiment, the first client device 110, the second client device 120, the search provider 150 and the content provider 140 are communicatively interconnected via the communications network 130. The search provider 150 may maintain the search database 170 which stores an index of one or more web documents accessed from the content provider 140 via communication pathways that the network 130 provides. Examples of web documents include web pages, video clips, audio clips, etc.

In accordance with one embodiment, the first client device 110 or the second client device 120 may transmit one or more search requests that contain one or more search queries to the search engine 164 of the search provider 150 via the user interface 162. The search engine 164 may handle the one or more incoming search requests and perform a search of the index at the search database 170, as is known by those of skill in the art. The search engine 164 may then retrieve one or more relevant search results responsive to the search request from the search database 170 and display the search results on the user interface 162. A user of the first client device 110 or the second client device 120 may view the one or more relevant search results.

A user of the first client device 110 or the second client device 120 may have the option of tagging the one or more relevant search results as falling within a category topic. For example, a user of the first client 110 may review a search result for a web document, such as "www.espn.com" and tag the web document as falling within the category "Sports". The tag module 166 may then receive and associate the one or more tags for the one or web documents in the search database 170. Additionally, the tag module 166 may then transmit information regarding the web document that has been tagged, the tag associated with the web document and the user who has tagged the web document to the identification module 168. As used herein, the term "tag" refers to any arbitrary item of metadata associated with a content item, for example, one or more terms or phrases associated with an item of information (such as text data, audio data, video data, image data, etc.). A given tag may describe a content item for classification purposes or for non-classification purposes, and may comprise one or more folders, categories, etc.

In accordance with one embodiment, a user of the second client device 120 transmits one or more search requests that contain one or more search queries to the search engine 164 of the search provider 150 via the user interface 162. As described above, the search engine 164 may handle the one or more incoming search requests and perform a search of the index at the search database 170. The search engine 164 may identify one or more relevant search results responsive to the search request and display the search results on the user interface 162 with corresponding tags associated with a given a given search result. The user of the second client device 120 may have the option of agreeing with or disagreeing with the tag associated with a given web document corresponding to a given search result.

The identification module 168 may receive information regarding agreement with the one or more tags associated with the one or web document. For example, a user of the second client 120 may review a search result for a web document, such as "www.espn.com" with an associated tag as falling within the category "Sports", and submit that he or she agrees with the association of the tag "Sports" with the web document. The identification module 168 may then record the number of users that agree with the one or more tags associated with the one or more web documents for a given time period. The identification module 168 may identify a user of the first client device 110 as an expert for a particular category based upon the number of users that agree with the one or more tags associated with the one or more web documents for a given time period. Methods for determining one or more experts corresponding to categories of web documents are described in greater detail below with respect to the description of FIGS. 2 through 3.

In accordance with one embodiment, the graph module 180 may organize the web documents in a web graph format representative of the web documents available in the search database 170, where web documents of the same category are linked together. The identification module 168 may transmit information regarding identification of experts to the graph module 180. The graph module 180 may in turn supplement the web graph of available web documents with information regarding categorization of the web documents by one or more experts, such information being stored in the search database 170. Methods for supplementing the web graph of linked documents are described in greater detail below with respect to the description of FIGS. 4 through 6.

In accordance with one embodiment, a user of the first client device 110 or the second client device 120 may subsequently transmit one or more search requests that contain one or more search queries to the search engine 164 of the search provider 150 via the user interface 162. As described earlier, the search engine 164 may handle the one or more incoming search requests and perform a search of the index at the search database 170. The search engine 164 may then retrieve one or more relevant search results responsive to the search request from the search database 170 and display the search results on the user interface 162 with corresponding tags associated with a given web document corresponding to a given search result and with corresponding expert information associated with a given web document. Methods for generating search results comprising web documents with associated expert information will be described in further detail below with respect to the description of FIGS. 8 through 12.

Figure 2:
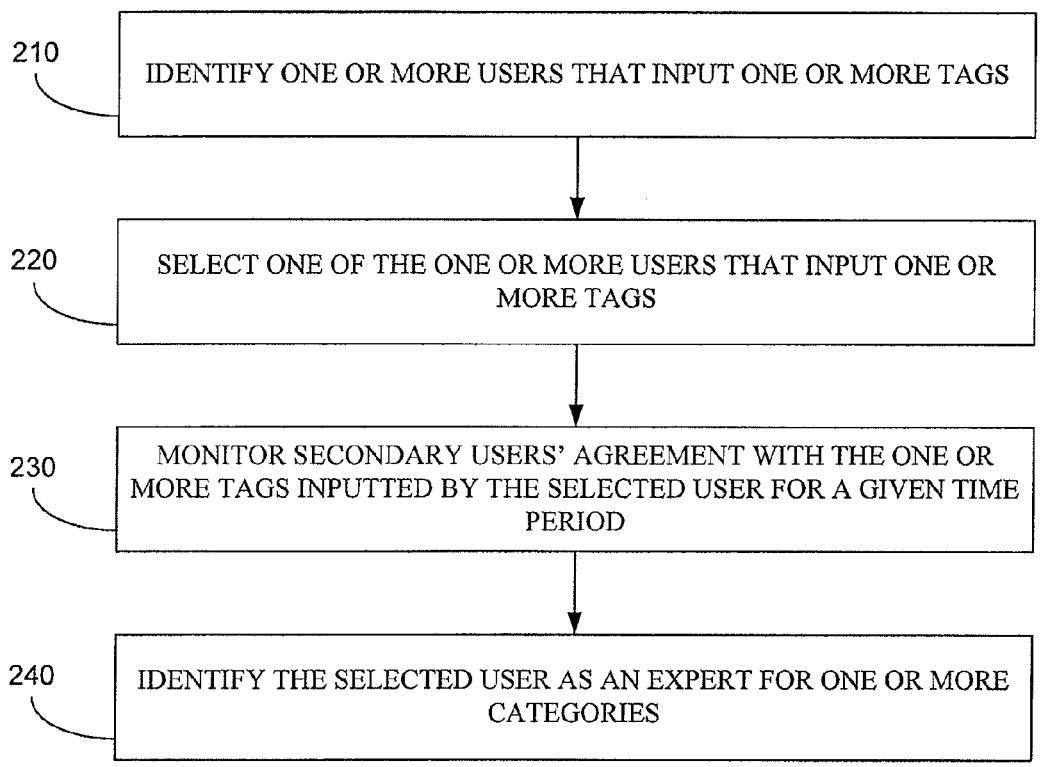
FIG. 2 illustrates a flow diagram presenting a method for determining one or more experts corresponding to categories of web documents according to one embodiment of the present invention.

FIG. 2 illustrates a flow diagram presenting a method for determining one or more experts corresponding to categories of web documents according to one embodiment of the present invention. In accordance with the embodiment of FIG. 2, the method comprises identifying one or more users that input one or more tags, step 210. One of the one or more users that input one or more tags may be selected, step 220. For example, a user viewing the web page located at the URL "www.espn.com" may tag one or more web pages as a "Sports" web documents. Agreement by secondary or subsequent users with the one or more tags inputted by the selected user may be then monitored for a given time period, step 230. Continuing from the previous example, subsequent users who view the webpage located at the URL "www.espn.com", may also view the associated tag "Sports" and have the option to agree or disagree with the "Sports" category tag. An identification module, such the identification module 168 of FIG. 1, may monitor agreement or disagreement by subsequent users with the given tag. The selected user may be then identified as expert for one or more categories, step 240. For example, an identification module may determine that, on the basis of the number of subsequent or secondary users who agreed with the initial user who tagged the webpage "www.espn.com" with a "Sports" tag, is an expert for the tag category "Sports".

Figure 3:
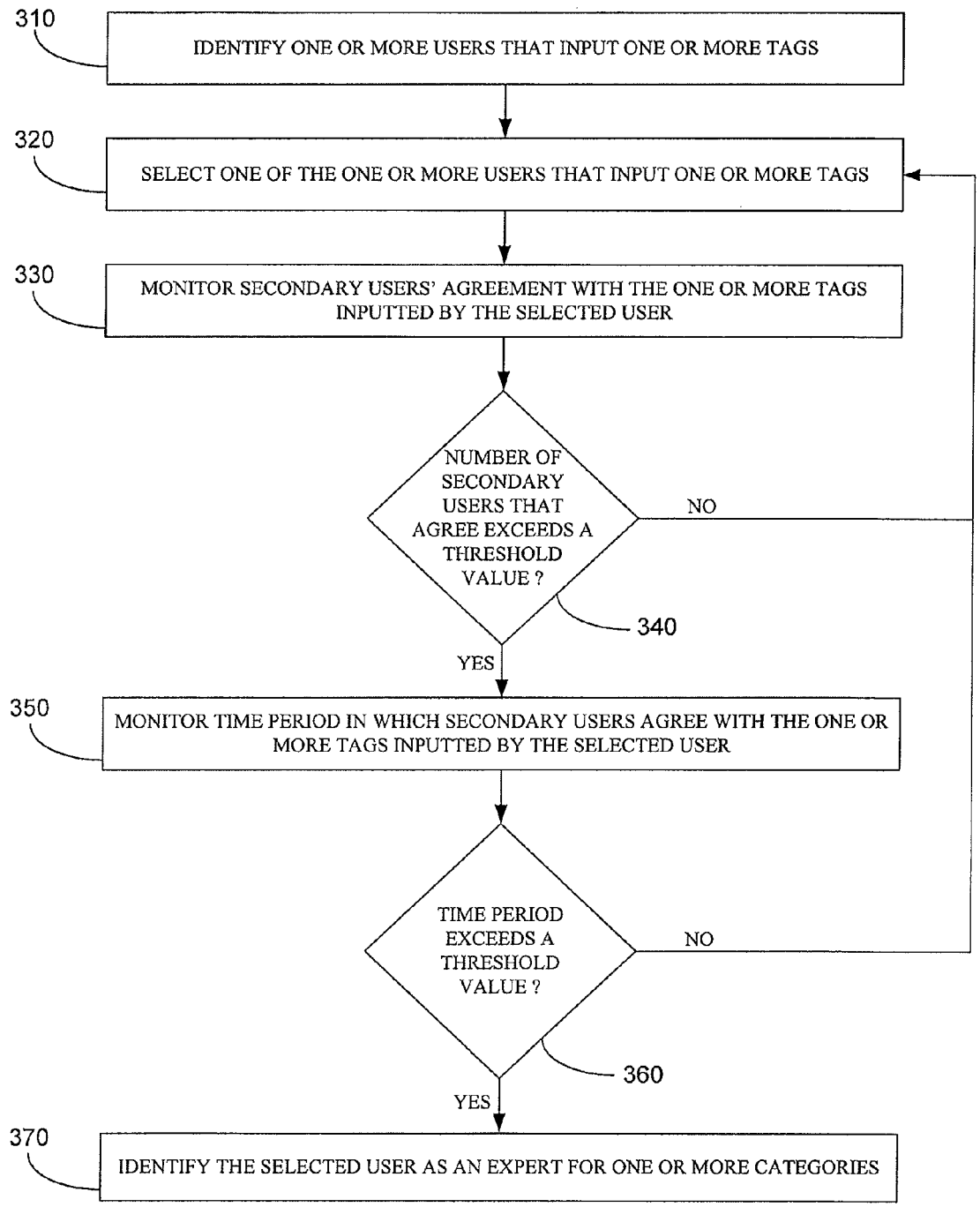
FIG. 3 illustrates a detailed flow diagram presenting a method for determining one or more experts corresponding to categories of web documents according to one embodiment of the present invention.

FIG. 3 illustrates a detailed flow diagram presenting a method for determining one or more experts corresponding to categories of web documents according to one embodiment of the present invention. In accordance with the embodiment of FIG. 3, the method comprises identifying one or more users that input one or more tags, step 310, with a given one of the one or more users that input one or more tags selected, step 320. Agreement by secondary users with the one or more tags inputted by the selected user may be monitored, step 330, and a determination made as to whether the number of secondary users that agree with the one or more tags inputted by the selected users exceeds a threshold value, step 340. Continuing from the previous example, a determination may be made as to whether at least 1000 secondary users agree with the tag "Sports" applied to the web page located at the URL "ww.espn.com", which was input by a first user.

If the number of secondary users that agree does not exceed a threshold value, program flow may then return to step 320. If the number of secondary users that agree does exceed a threshold value, then the time period in which secondary users agree with the one or more tags inputted by the selected user may be monitored, step 350. A determination may be then made as to whether the time period monitored exceeds a threshold value, step 360. For example, if the determination made that 1000 secondary users agreed with the tag "Sports" applied to the web page located at the URL "ww.espn.com" inputted by a first user, a second determination may be made as to whether the 10000 secondary users agreed during a 30 day time period. If the time period does not exceed a threshold value, program flow returns to step 320. If the time period does exceeds a threshold value, then the selected user is identified as an expert for one or more categories, step 370.

Figure 4:
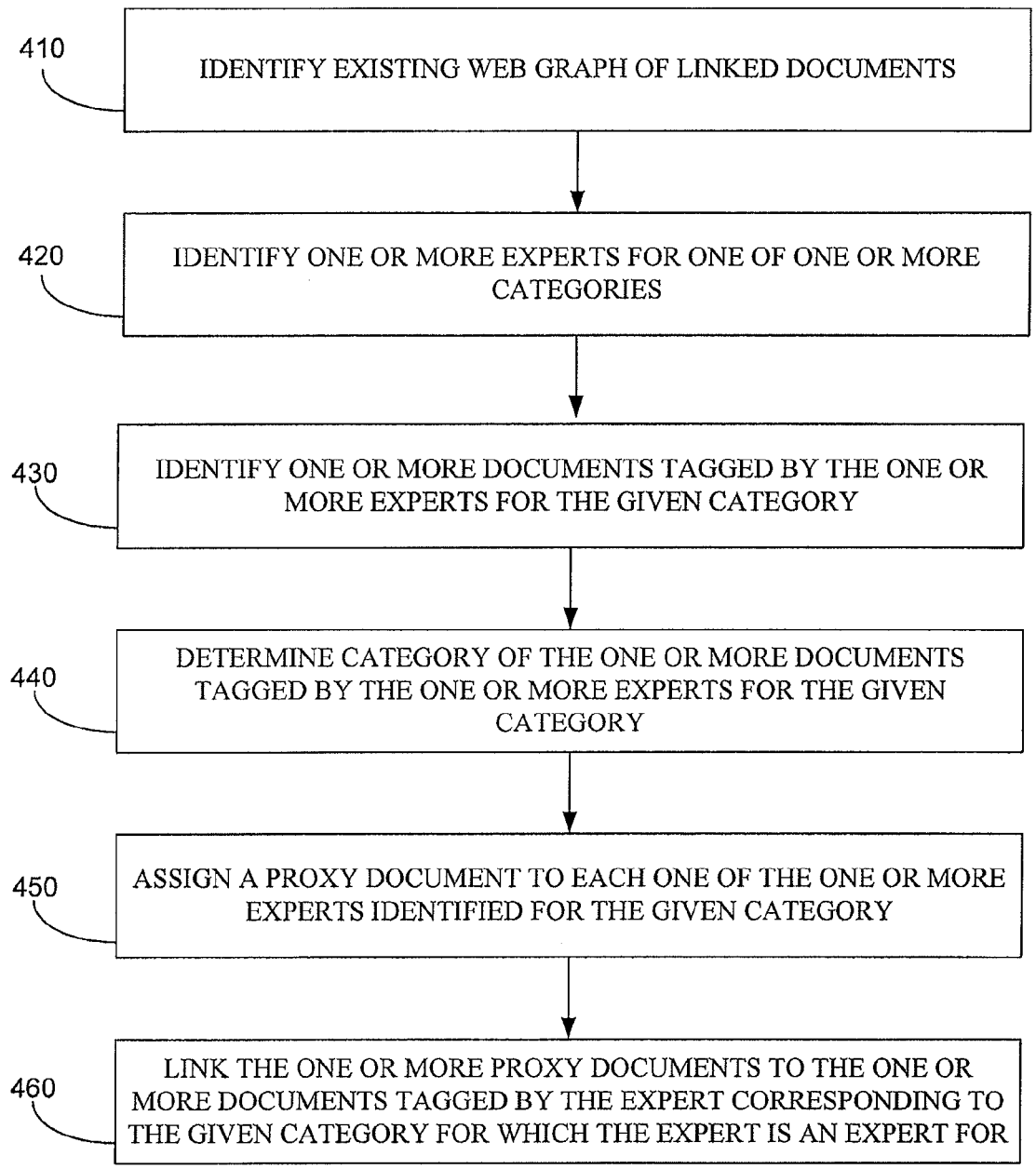
FIG. 4 illustrates a flow diagram presenting a method for supplementing the web graph of linked documents according to one embodiment of the present invention.

FIG. 4 illustrates a flow diagram presenting a method for supplementing the web graph of linked documents according to one embodiment of the present invention. In accordance with the embodiment of FIG. 4, the method may begin by identifying an existing web graph of linked documents, step 410, and identifying one or more experts for one of one or more categories, step 420. One or more documents tagged by the one or more experts for the given category may be then identified, step 430. The category of the one or more documents tagged by the one or more experts for the given category may be determined, step 440. Continuing from the previous example, the first user may be identified as an expert for the category "Sports" based upon the subsequent analysis performed on the first user's tagging of the web page located at the URL "www.espn.com". Other web documents tagged by the first user expert with the tag "Sports" may then be identified.

A proxy document may be assigned to a given one of the one or more experts identified for the given category, step 450. One or more proxy documents may be then linked to the one or more documents tagged by the expert corresponding to the given category for which the expert is an expert, step 460. For example, a proxy document representative of the first user expert may be implemented in a web graph representative of a database of web documents and linked to one or more web documents the first user expert has tagged with the "Sports" tag. To provide an additional example, the first user expert may have tagged the web document located at the URL "www.foxsports.com" and the web document located at the URL "www.sportsillustrated.cnn.com" with the tag "Sports".

The proxy document representative of the first user expert may be linked to the three web documents in the web graph.

Figure 5:
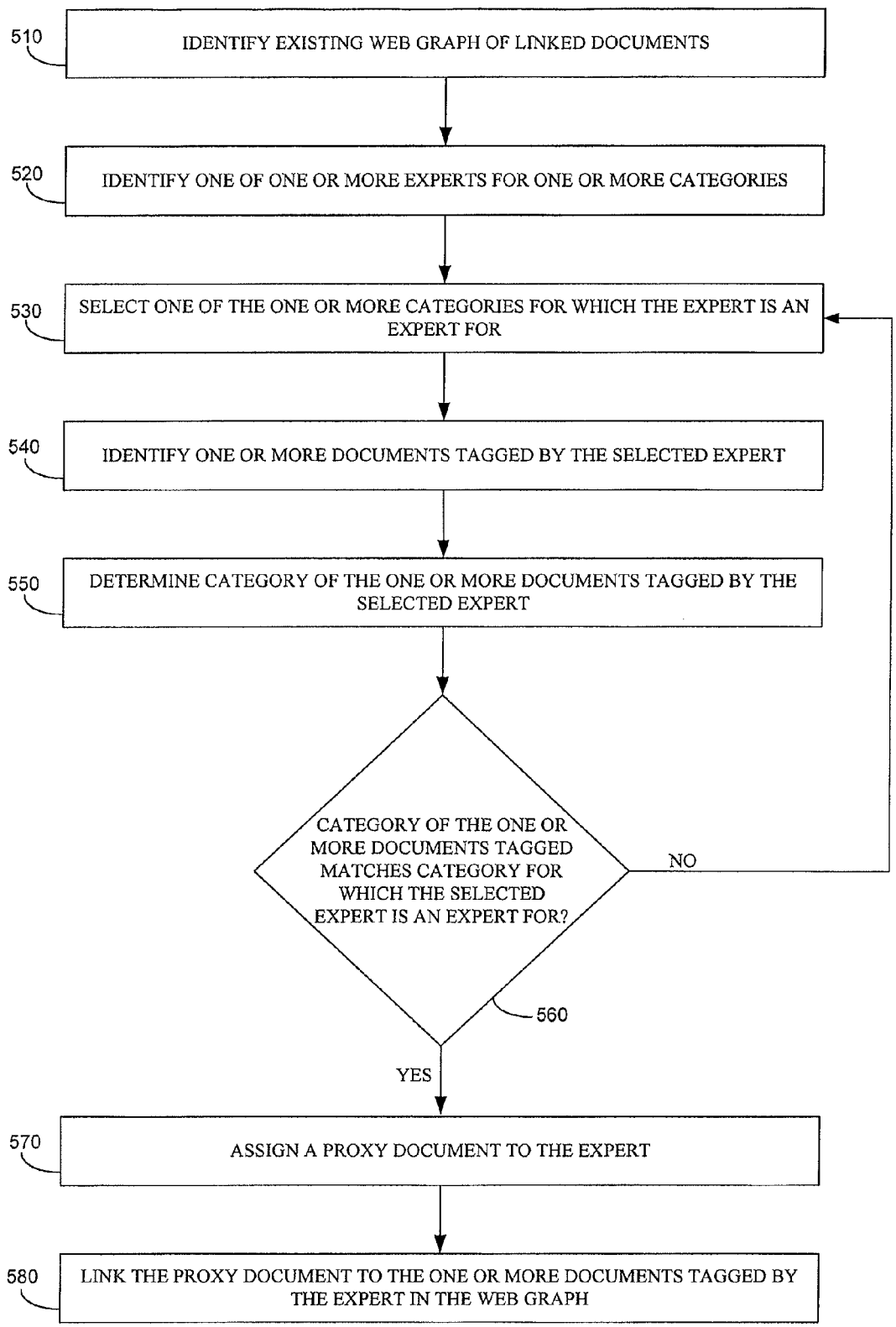
FIG. 5 illustrates a detailed flow diagram presenting a method for supplementing the web graph of linked documents according to one embodiment of the present invention.

FIG. 5 illustrates a detailed flow diagram presenting a method for supplementing the web graph of linked documents according to one embodiment of the present invention. In accordance with the embodiment of FIG. 5, the method comprises identifying an existing web graph of linked documents, step 510, and identifying one of the one or more experts for one or more categories, step 520. A given one of the one or more categories for which the user is an expert for may be selected, step 530, and one or more documents tagged by the selected expert may then be identified, step 540. The category of the one or more documents tagged by the selected expert may then be determined, step 550. A determination may be made as to whether the category of the one or more documents matches the category for which the selected user is an expert, step 560.

If the category of the one or more documents tagged does not match the category for which the selected expert is an expert for, program flow may then return to step 530. Continuing from the previous example, if the first user expert tagged a web document with the tag "Cooking", the determination would be made that the category of the tag for the web document does not match the category for which the first user is an expert for, namely "Sports". If the category of the one or more documents tagged matches the category for which the selected expert is an expert, a proxy document may be assigned to represent the expert, step 570. The proxy document may be then linked to the one or more documents tagged by the expert in the web graph, step 580.

Figure 6:
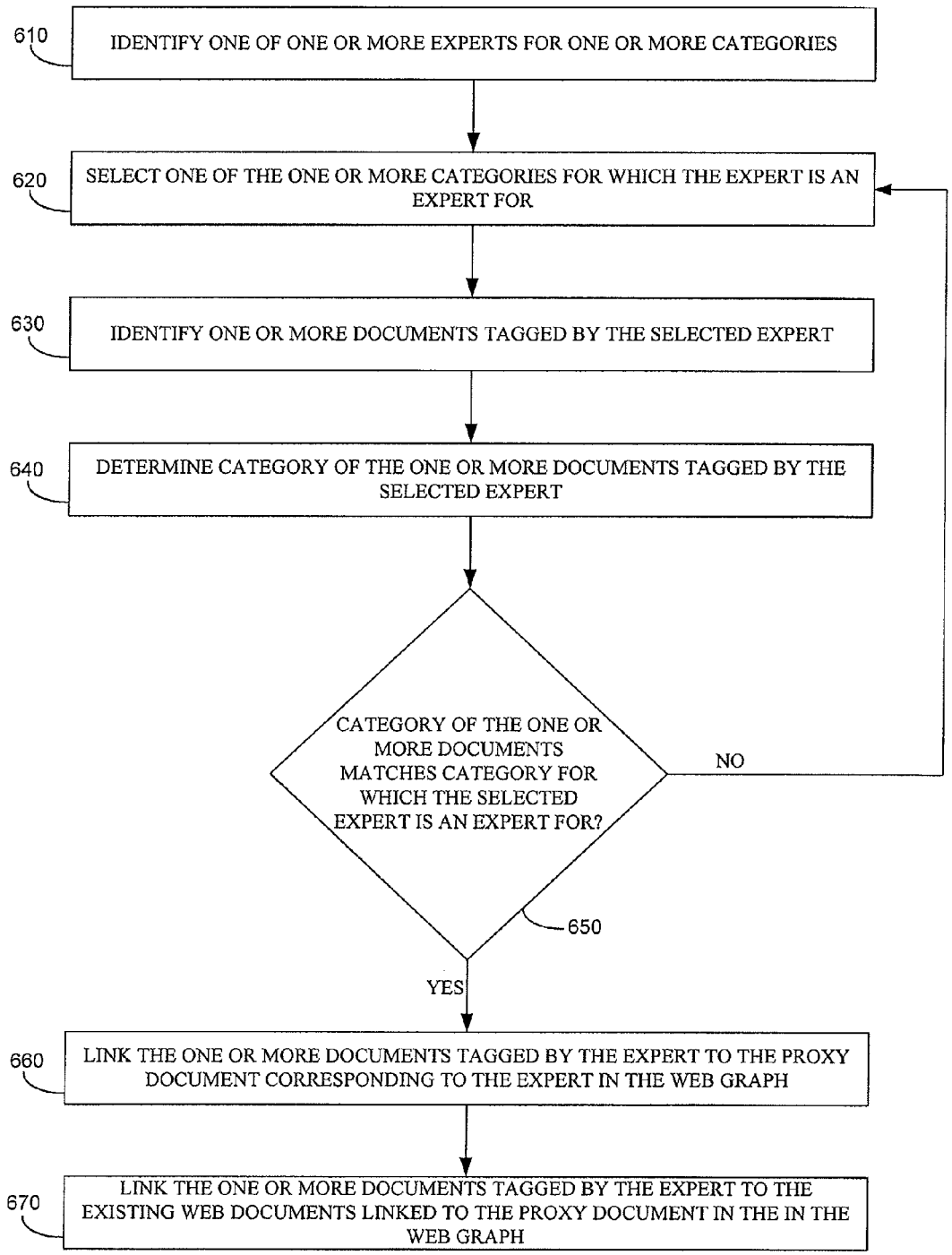
FIG. 6 illustrates a detailed flow diagram presenting a method for supplementing the web graph of linked documents according to another embodiment of the present invention.

FIG. 6 illustrates a detailed flow diagram presenting a method for supplementing the web graph of linked documents according to another embodiment of the present invention. In accordance with the embodiment of FIG. 6, the method comprises identifying one or more experts for one or more categories, step 610, and selecting one of the one or more categories for which the expert is an expert, step 620. One or more documents tagged by the selected expert may be then identified, step 630. The category of the one or more documents tagged by the selected expert is determined, step 640, and a determination may be made as to whether the category of the one or more documents matches the category for which the selected expert is an expert, step 650.

If the category of the one or more documents tagged does not match the category for which the selected expert is an expert, program flow may then return to step 620. If the category of the one or more documents tagged matches the category for which the selected expert is an expert, then the one or more documents tagged by the expert may be linked to the proxy document corresponding to the expert in the web graph, step 660. The one or more documents tagged by the expert may then be also linked to the existing web documents that are linked to the proxy document in the web graph.

Figure 7:
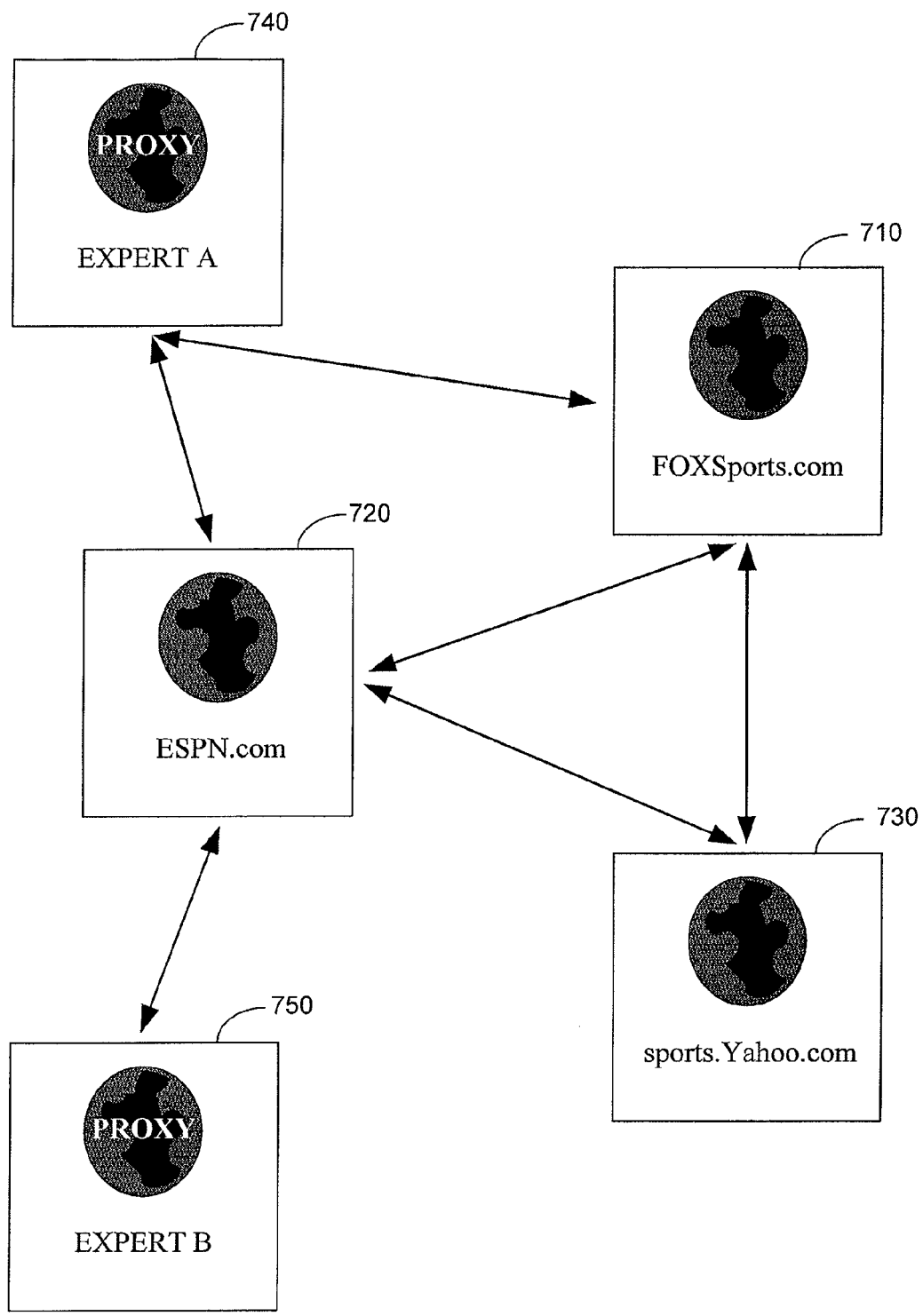
FIG. 7 illustrates a sample web graph of documents according to one embodiment of the present invention.

FIG. 7 illustrates a block diagram presenting a sample web graph of linked documents according to one embodiment of the present invention. Web documents 710, 720 and 730 may be web documents identified in the search database maintained by a search provider that are linked together as they are web documents that fall within the category "Sports" or otherwise have a relationship, such as hyperlinks between the web documents 710, 720, 730. Web documents 740 and 750 are proxy web documents that represent users who have been identified as experts. According to FIG. 7, web document 740 represents Expert A who is an expert for the category "Sports" and has tagged web document 710 and web document 720 with the tag "Sports". Similarly, web document 750 represents Expert B who is also an expert for the category "Sports" and has tagged web document 720 with the tag "Sports".

In another embodiment of the present invention, web document 710 may represent a web document that was not stored within the index that the search provider maintains, but which was tagged by Expert A, represented by web document 740, as falling within the "Sports" category. Therefore, web document 710 may be implemented in the web graph and linked to web document 740, as well web documents 720 and 730, which also fall within the category of "Sports".

Figure 8:
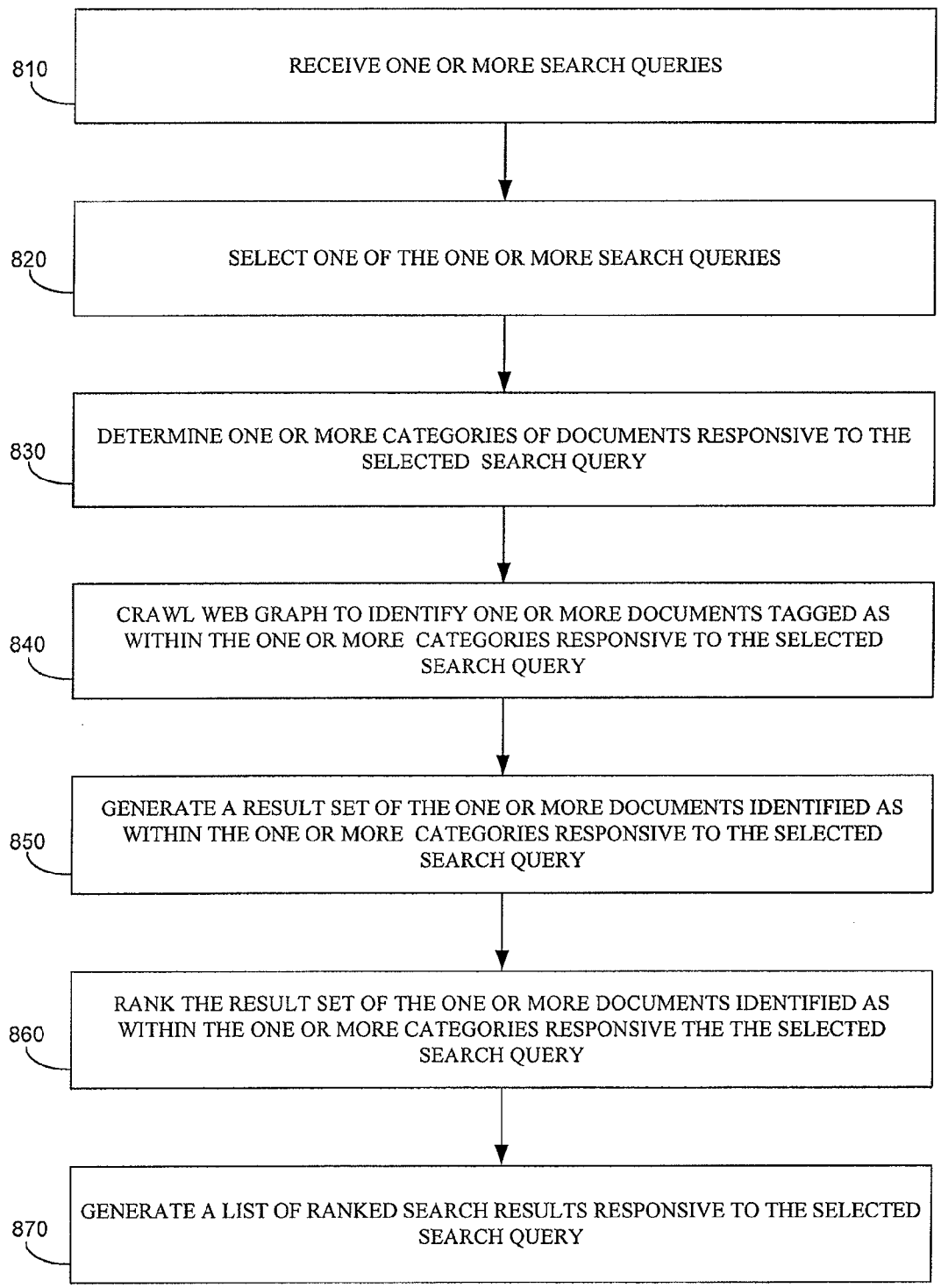
FIG. 8 illustrates a flow diagram presenting a method for generating search results comprising web documents with associated expert information according to one embodiment of the present invention.

FIG. 8 illustrates a flow diagram presenting a method for generating search results comprising web documents with associated expert information according to one embodiment of the present invention. In accordance with the embodiment of FIG. 8, the method comprises receiving one or more search queries, step 810. A given one of the one of the one or more search queries may be selected, step 820, and one or more categories of documents responsive to the selected search query may be determined, step 830. According to one embodiment, the web graph is crawled to identify one or more documents tagged as within the one or more categories responsive to the selected search query, step 840, with the generation of a result set of the one or more documents identified as within the one or more categories responsive to the selected search query, step 850. For example, a user may submit a search query for "sports scores" and a search engine maintained by a search provider may determine that documents that fall within the category of "Sports" would be responsive to the search query.

For example, the engine may crawl the index at the search database that is organized in a web graph format and return a result set comprising three web documents located at the following URLs: (i) www.espn.com, (ii) www.foxsports.com and (iii) www.sportsillustrated.cnn.com. The result set comprising one or more documents identified as within the one or more categories responsive to the selected search query may be ranked, step 860. For example, a ranking of the result set may be made on the basis of the number of links that are linked to the web documents or the number of experts that have tagged the web document. A list of the ranked search results responsive to the selected search query may be generated, step 870. In another embodiment, the list of ranked search results responsive to the selected search query may be displayed in conjunction with the corresponding one or more experts that have tagged a given search result. In another embodiment, the list of ranked search results responsive to the selected search query may be displayed with the corresponding web documents that are linked to a given search result.

Figure 9:
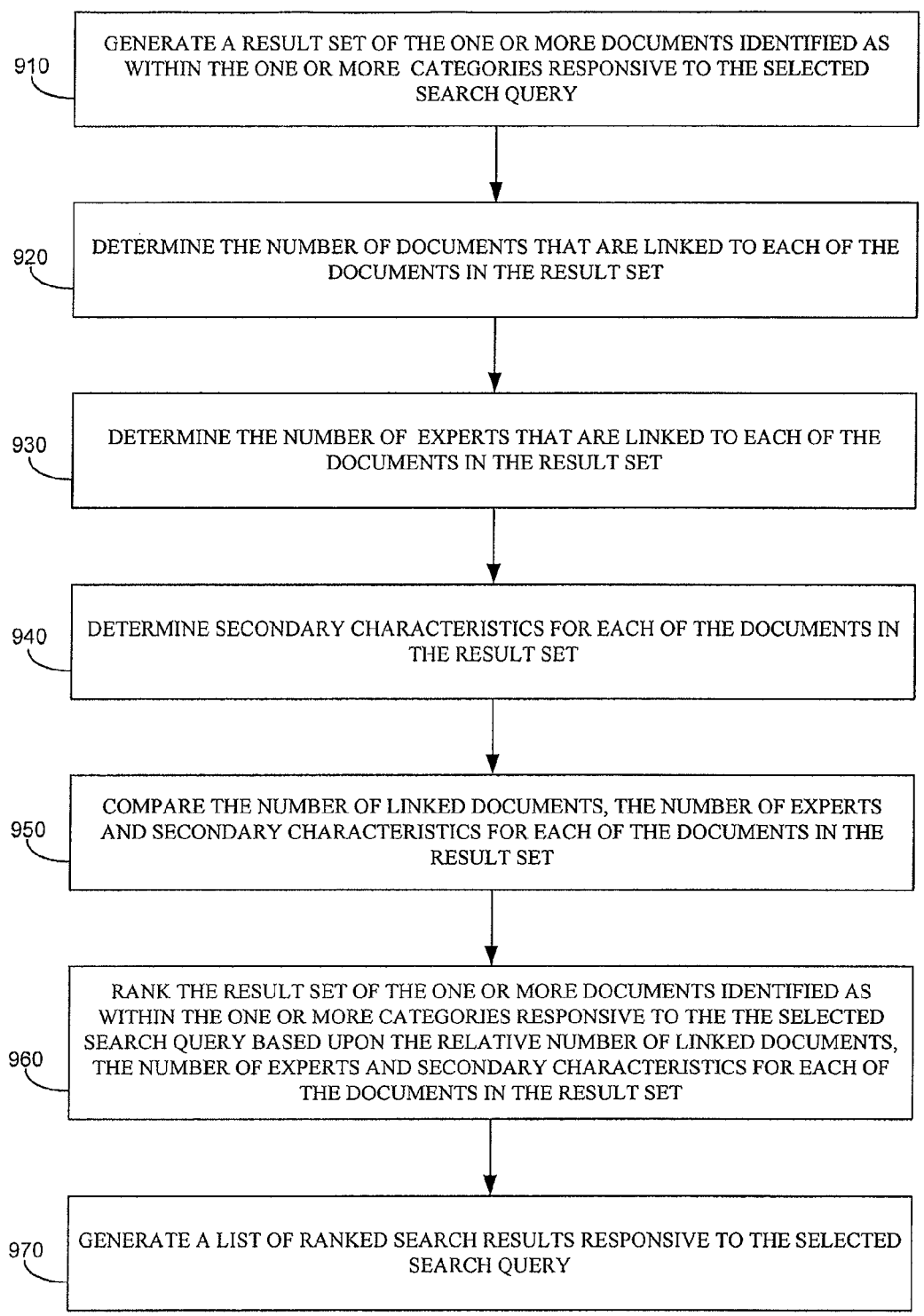
FIG. 9 illustrates a flow diagram presenting a method for ranking search results comprising web documents with associated expert information according to one embodiment of the present invention.

FIG. 9 illustrates a flow diagram presenting a method for ranking search results comprising web documents with associated expert information according to one embodiment of the present invention. In accordance with the embodiment of FIG. 9, the method comprises generating a result set of one or more documents identified as within the one or more categories responsive to the selected search query, step 910. The number of documents that are linked to a given one of the documents in the result set may then be determined, step 920. A determination may then be made as to the number of experts that are linked to a given one of the documents in the result set, step 930.

Secondary characteristics for a given one of the documents in the result then may then be determined, step 940. The number of linked documents and the number of experts, as well as secondary characteristics for a given one of the documents in the result set, may be compared, step 950. The result set of the one or more documents identified as falling within the one or more categories responsive to the selected search query may be ranked on the basis of the relative number of linked documents, the number of experts and secondary characteristics for a given one of the documents in the result set, step 960. A list of ranked search results responsive to the selected search query may then be generated, step 970.

Figure 10:
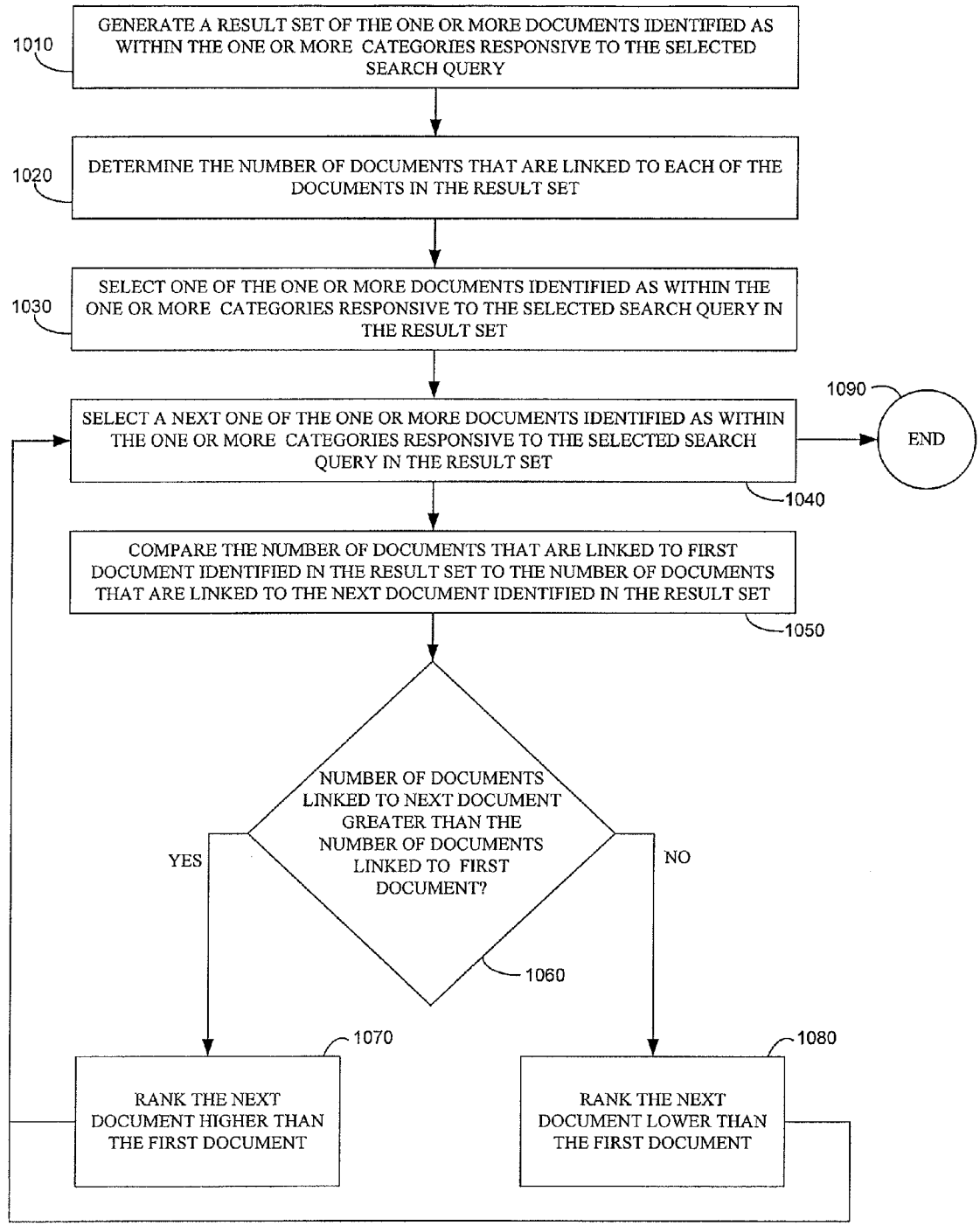
FIG. 10 illustrates a detailed flow diagram presenting a method for ranking search results comprising web documents with associated expert information according to one embodiment of the present invention.

FIG. 10 illustrates a detailed flow diagram presenting a method for ranking search results comprising web documents with associated expert information according to one embodiment of the present invention. In accordance with the embodiment of FIG. 10, the method comprises generating a result set of the one or more documents identified as within the one or more categories responsive to the selected search query, step 1010. The number of documents that are linked to a given one of the documents in the result set may then be determined, step 1020, and one of the one or more documents identified as within the one or more categories responsive to the selected search query in the result set may be selected, step 1030.

A second, or next one of the one or more documents identified as within the one or more categories responsive to the selected search query in the result set may be selected, step 1040. The number of documents that are linked to the first document identified in the result set may then be compared to the number of documents that are linked to the next document identified in the result set, step 1050. Similarly, the number of experts that are linked to the first document identified in the result set may be compared with the number of experts that are linked to the next document identified in the result set. Alternatively, or in conjunction with the foregoing, one or more secondary characteristics for the first document identified in the result set may be compared to the one or more secondary characteristics for the next document identified in the result set.

A determination may then be made as to whether the number of documents linked to the next document is greater than the number of documents linked to the first document, step 1060. If the number of documents linked to the next document is greater than the number of documents linked to the first document, than the next document may be ranked higher than the first document, step 1070. Otherwise, the next document may be ranked lower than the first document, step 1080. Program flow may then return to step 1040, where a third or next one of the one or more documents identified as within the one or more categories responsive to the selected search query in the result set is selected. If there remain no documents identified as within the one or more categories responsive to the selected search query in the result set, the method will end, step 1090.

According to another embodiment, which may be performed in conjunction with other embodiments described herein, a determination may be made as to whether the number of experts linked to the next document is greater than the number of documents linked to the first document, step 1160. If the number of experts linked to the next document is greater than the number of experts linked to the first document, than the next document may be ranked higher than the first document, step 1170. Otherwise, the next document may be ranked lower than the first document, step 1180. According to still further embodiments of the present invention, which may be performed in conjunction with other embodiments described herein, a determination may be made as to whether the quality of the one or more secondary characteristics for the next document is greater than the quality of the one or more secondary characteristics for the first document, step 1260. If the quality of the one or more secondary characteristics for the next document is greater than quality of the one or more secondary characteristics for the first document, than the next document may be ranked higher than the first document, step 1270. Otherwise, the next document may be ranked lower than the first document, step 1280.

Continuing from the previous example, the result set may comprise three web documents located at the following URLs: (i) www.espn.com, (ii) www.foxsports.com and (iii) www.sportsillustrated.cnn.com which are responsive to the search query "Sports scores" as the three web documents fall within the "Sports" category. The web document located at the URL www.espn.com may have five web documents linked to it within a web graph, the web document located at the URL www.foxsports.com may have three web documents linked to it, and the web document located at the URL www.sportsillustrated.cnn.com may have one web document linked to it. Therefore, the result set of web documents would be ranked with www.espn.com listed first, www.foxsports.com listed second and www.sportsillustrated.cnn.com listed third. Similarly, the web document located at the URL "www.espn.com" may have been tagged by four experts as falling with the category "Sports", the web document located at the URL "www.foxsports.com" may have been tagged by two experts, and the web document located at the URL "www.sportsillustrated.cnn.com" may have not been tagged by an expert. Therefore, the result set of web documents may be ranked with "www.espn.com" listed first, "www.foxsports.com" listed second and "www.sportsillustrated.cnn.com" listed third.

Therefore, the present invention provides for systems and methods for generating search results comprising web documents with reliable user evaluation information by creating expert user evaluations and associating such evaluations with corresponding search results.

FIGS. 1 through 10 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the Figs. and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

What is claimed is:

1. A method for generating search results comprising web documents with associated expert information, the method comprising:
    identifying a plurality of web documents tagged as falling within one or more categories of web documents responsive to one or more search queries;
    ranking the plurality of web documents tagged as falling within the one or more categories responsive to the one or more search queries based at least on a number of experts of the one or more categories that tagged respective ones of the plurality of web documents, wherein a given expert is determined based upon a number of users that agree with the input of one or more tags by the given expert exceeding a threshold value; and
    generating a list of ranked search results responsive to the one or more search queries.

2. The method of claim 1 wherein ranking the plurality of web documents tagged as falling within the one or more categories of web documents responsive to the selected search query comprises ranking the documents further based upon the number of web documents linked to the one or more documents of the result set.

3. The method of claim 1 wherein generating a list of ranked search results responsive to the one or more search queries further comprises displaying one or more corresponding experts that have tagged the one or more documents of the result set with the list of search results.

4. The method of claim 1 wherein generating a list of ranked search results responsive to the one or more search queries further comprises displaying one or more one or more corresponding web documents that are linked to the one or more documents of the result set with the list of search results.

5. The method of claim 1 wherein primary users are identified as experts of the one or more categories of web documents based on a number of secondary users that agree with the plurality of primary users tagging of web documents as falling within the one or more categories.

6. The method of claim 5, wherein the plurality of web document are tagged as falling within the one or more categories by a plurality of experts of the one or more categories.

7. Non-transitory computer readable media comprising program code that when executed by a programmable processor causes execution of a method for generating search results comprising web documents with associated expert information, the computer readable media comprising:
    program code for identifying a plurality of web documents tagged as falling within one or more categories of web documents responsive to one or more search queries;
    program code for ranking the plurality of web documents tagged as falling within the one or more categories responsive to the one or more search queries based at least on a number of experts of the one or more categories that tagged respective ones of the plurality of web documents, wherein a given expert is determined based upon a number of users that agree with the input of one or more tags by the given expert exceeding a threshold value; and
    program code for generating a list of ranked search results responsive to the one or more search queries.

8. The computer readable media of claim 7 wherein program code for ranking the plurality of web documents tagged as falling within the one or more categories responsive to the one or more search queries comprises program code for ranking the documents further based upon the number of web documents linked to the one or more documents of the result set.

9. The computer readable media of claim 7 wherein program code for generating a list of ranked search results responsive to the one or more search queries further comprises program code for displaying one or more corresponding experts that have tagged the one or more documents of the result set with the list of search results.

10. The computer readable media of claim 7 wherein program code for generating a list of ranked search results responsive to the one or more search queries further comprises program code for displaying one or more one or more corresponding web documents that are linked to the one or more documents of the result set with the list of search results.

11. The computer readable media of claim 7 wherein primary users are identified as experts of the one or more categories of web documents based on a number of secondary users that agree with the plurality of primary users tagging of web documents as falling within the one or more categories.

12. The computer readable media of claim 11, wherein the plurality of web document are tagged as falling within the one or more categories by a plurality of experts of the one or more categories.

13. A system for generating search results comprising web documents with associated expert information, the system comprising at least one server coupled to a plurality of client devices over a network, the at least one server operative at least to:

identify a plurality of web documents tagged as falling within one or more categories of web documents responsive to one or more search queries received from at least one of the client devices;

rank the plurality of web documents tagged as falling within the one or more categories responsive to the one or more search queries based at least on a number of experts of the one or more categories that tagged respective ones of the plurality of web documents, wherein a given expert is determined based upon a number of users that agree with the input of one or more tags by the given expert exceeding a threshold value; and generate a list of ranked search results responsive to the one or more search queries.

14. The system of claim 13 wherein the at least one server is operative to rank the plurality of documents further based upon the number of web documents linked to the one or more documents of the result set.

15. The system of claim 13 wherein the at least one server is operative to display one or more corresponding experts that have tagged the one or more documents of the result set with the list of search results.

16. The system of claim 13 wherein the at least one server is operative to display one or more one or more corresponding web documents that are linked to the one or more documents of the result set with the list of search results.

17. The system of claim 13 wherein primary users are identified as experts of the one or more categories of web documents based on a number of secondary users that agree with the plurality of primary users tagging of web documents as falling within the one or more categories.

18. The system of claim 17, wherein the plurality of web document are tagged as falling within the one or more categories by a plurality of experts of the one or more categories.

* * * * *